United States Patent [19]

Itsuaki

[11] Patent Number: 5,386,890

[45] Date of Patent: Feb. 7, 1995

[54] DISK BRAKE HAVING MEANS TO PREVENT UNEVEN BRAKE PAD WEAR

[75] Inventor: Satoru Itsuaki, Itami, Japan

[73] Assignee: Sumitomo Electric Industries, Ltd., Osaka, Japan

[21] Appl. No.: 206,201

[22] Filed: Feb. 28, 1994

Related U.S. Application Data

[63] Continuation of Ser. No. 3,125, Jan. 12, 1993, abandoned.

[30] Foreign Application Priority Data

Jan. 13, 1992 [JP] Japan .................................. 4-004016

[51] Int. Cl.⁶ ............................................. F16D 55/18
[52] U.S. Cl. ................................... 188/73.35; 188/72.4
[58] Field of Search ............... 188/73.37, 73.35, 73.36, 188/72.4, 72.5, 73.31, 73.41, 250 R

[56] References Cited

U.S. PATENT DOCUMENTS

| | | | |
|---|---|---|---|
| 3,409,106 | 11/1968 | Meier et al. | 188/73.37 |
| 3,460,652 | 8/1969 | Botterill | 188/73.37 |
| 3,490,563 | 1/1970 | Hahm | 188/73.37 |
| 4,064,974 | 12/1977 | Filderman | 188/72.5 X |
| 4,093,045 | 6/1978 | Kawamura | 188/73.5 |
| 4,155,430 | 5/1979 | Kawamura | 188/73.37 |
| 4,722,424 | 2/1988 | Ikeuchi | 188/73.37 |
| 4,886,147 | 12/1989 | Kroniger et al. | 188/73.37 |

FOREIGN PATENT DOCUMENTS

| | | |
|---|---|---|
| 1153949 | 3/1964 | Germany . |
| 0061107 | 9/1982 | Germany . |
| 3842429 | 6/1990 | Germany . |
| 0052074 | 4/1977 | Japan .................................. 188/73.37 |
| 0160432 | 12/1981 | Japan .................................. 188/73.31 |

*Primary Examiner*—Robert J. Oberleitner
*Assistant Examiner*—Peter M. Poon
*Attorney, Agent, or Firm*—Wenderoth, Lind & Ponack

[57] ABSTRACT

A disk brake has a brake piston for biasing pads against a disk. The piston is arranged so that the center of its biasing force is offset toward the leading disk side from the center of the frictional surface of the pad. Also, the piston is arranged so that the center of the biasing force is offset toward the center of the disk from a line extending in the tangential direction of the disk and passing the center of the frictional surface of the pad. In another arrangement, a disk brake has a plurality of brake pistons adapted to bias respective pads. One of the brake pistons is located at the leading disk side and has a greater pressure bearing area than that of the other brake piston at the trailing disk side. The brake pistons are arranged so that the center their biasing forces are offset toward the center of the disk from the line extending in the tangential direction of the disk and passing the center of the frictional surfaces of the pads.

3 Claims, 2 Drawing Sheets

DISK BRAKE HAVING MEANS TO PREVENT UNEVEN BRAKE PAD WEAR

This application is a continuation of now abandoned application, Ser. No. 08/003,125, filed Jan. 12, 1993 now abandoned.

BACKGROUND OF THE INVENTION

This invention relates to a disk brake having pads which are less liable to be unevenly abraded.

An ordinary disk brake comprises a disk and friction members adapted to be urged by a hydraulic brake piston into frictional contact with the disk. The piston is arranged so that the center of its biasing force is located on a line extending in a tangential direction of the disk and passing a center of frictional surface of the pad or offset therefrom toward the outer periphery of the disk to increase the braking force with a larger effective braking radius, If the friction member of each pad comprises a plurality of segments, the respective segments have individual centers of frictional surface.

In such a disk brake, in order to reduce uneven abrasion of the pads at the disk trailing side due to angular moment that acts on the pads when braking, the brake piston is arranged so that the center of its biasing force is offset toward the leading disk side from the center of frictional surface of the pad. With a brake in which each pad is urged by a plurality of pistons receiving the same fluid pressure, the piston at the leading disk side is adapted to have a larger pressure bearing area than the piston at the trailing side in order to smooth out the distribution of the surface pressure on the pad in a tangential direction.

With a disk brake having no means for preventing uneven abrasion, as shown in FIG. 4, if a brake piston 3 is inclined in the tangential direction of the disk and becomes stuck in a cylinder 2 due to uneven abrasion of the pad in the tangential direction of the disk, it becomes difficult for the piston to incline in the radial direction of the disk in the cylinder 2. Thus, uneven abrasion of a pad 4 in the diametric direction of the disk will not develop any further.

In contrast, with the above-described disk brake provided with means for preventing uneven abrasion, the piston can incline more freely in the cylinder in the diametric direction of the disk than the former piston. A conventional disk brake of this type has its piston arranged so that the center of its biasing force is located on a line extending in a tangential direction of the disk (in a direction perpendicular to a diametric direction) and passing the center of frictional surface of the pad or offset therefrom toward the outer periphery of the disk. Thus, the surface pressure on the pad will be distributed uniformly in a tangential direction of the pad or will be stronger at its portion near the outer periphery of the disk, Due to these factors, due and also to the difference in revolving speeds between inner and outer parts of the disk, the pad tends to be abraded more rapidly at portions near the outer periphery of the disk, Thus, as a whole, the pad is abraded unevenly to a considerable degree in a diametric direction of the disk, it is therefore all object of the present invention to reduce uneven abrasion of the pad both in tangential and diametric directions of the disk.

SUMMARY OF THE INVENTION

According to the present invention, there is provided a disk brake having a brake piston arranged so that the center of the biasing force thereof is not only offset toward the leading disk side from the center of the frictional surface of the pad, but also is offset toward the center of the disk from the line extending in a tangential direction of the disk and passing through the center of the frictional surface of the pad.

Also, with a similar disk brake having a plurality of brake pistons adapted to bias a single pad, the brake pistons are arranged so that the center of the biasing force of each piston is offset toward the center of the disk from the line extending in a tangential direction of the disk and passing through the center of the frictional surface of each pad.

By arranging the piston so that the center of its biasing force is offset toward the center of the disk from the line extending in a tangential direction of the disk and passing through the center of the frictional surface of the pad. the surface pressure applied to each pad is greater at its inner peripheral portion than at its outer peripheral portion. The work done per unit area and unit hour is defined by (surface pressure) x (peripheral speed) x (friction coefficient). Since the surface pressure of the pad is greater at its inner peripheral part while the peripheral speed is smaller at the inner peripheral part, the difference in the amount of work done between the inner and outer peripheral parts resulting from the difference in peripheral speed is offset by the difference in surface pressure, Thus, according to the present invention, the difference in the amount of work between the inner and outer peripheral parts of the pad is small compared with a conventional brake. This reduces uneven abrasion of the pad in a diametric direction of the disk.

The present invention has solved the problem that the pad tends to be abraded unevenly in the diametric direction. Thus, changes in pedal stroke resulting from uneven abrasion of the pad can be reduced to a minimum. The pad has a longer life. Squeaking of the brake can also be reduced.

Further, since the braking energy is absorbed uniformly over the entire frictional surface of the pad. the brake works stably even under high-load braking conditions. Thus, the braking performance improves still further.

BRIEF DESCRIPTION OF THE DRAWINGS

Other features and objects of the present invention will become apparent from the following description, made with reference to the accompanying drawings, in which.

DETAILED DESCRIPTION OF THE PREFERRED EMBODIMENT

Figure 1:
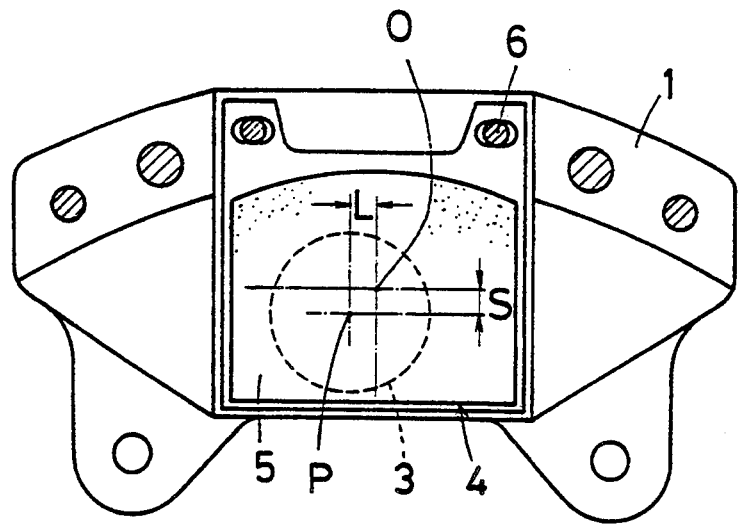
FIG. 1 is a front view of one embodiment of a disk brake according to the present invention, with an outer side of a caliper removed.

Referring to FIG. 1, a brake piston 3 is mounted in a cylinder of a caliper 1. A pad 4 is supported by pad pins so as to be slidable in an axial direction of the disk. In this embodiment, the pad 4 comprises an integrally formed single lining 5. Thus, the center O of the frictional surface of the pad 4 is located at the intersection of the center lines of the single lining 5 with respect to a peripheral direction and a diametric direction of the disk. The piston 3 for the brake is arranged so that center P of its biasing force is offset a distance L toward the leading disk side from the center O of the frictional surface of the pad and also offset a distance S toward the center of the disk from the line extending in a tangential direction of the disk and passing the center O. With this arrangement, uneven abrasion of the pad can be reduced not only in a tangential direction of the disk but in its diametric direction.

Figure 2:
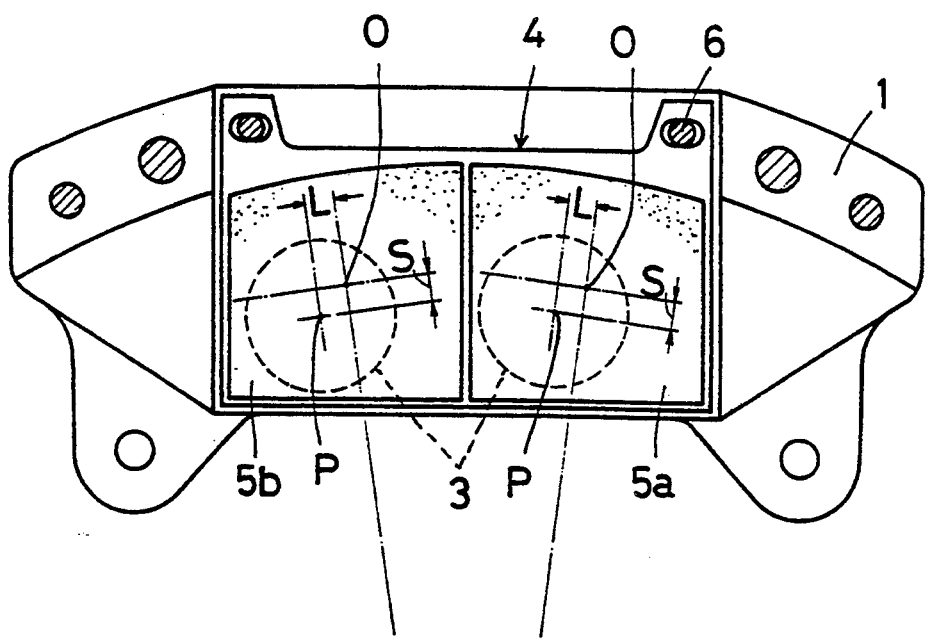
FIG. 2 is a front view of another embodiment of a disk brake showing the same condition as FIG. 1.

FIG. 2 shows another embodiment in which two brake pistons 3 having the same diameter (and thus the same pressure bearing surface) are used to bias a single pad 4. In this case, the pad 4 comprises two lining segments 5a and 5b. The respective segments have individual centers O of their frictional surfaces. Each piston 3 is arranged so that the center P of its biasing force is offset a distance toward the leading disk side from the center O of the frictional surface of the respective pad 4 and also offset a distance S toward the center of the disk from tile line extending in a tangential direction of the disk and passing the respective center O.

Figure 3:
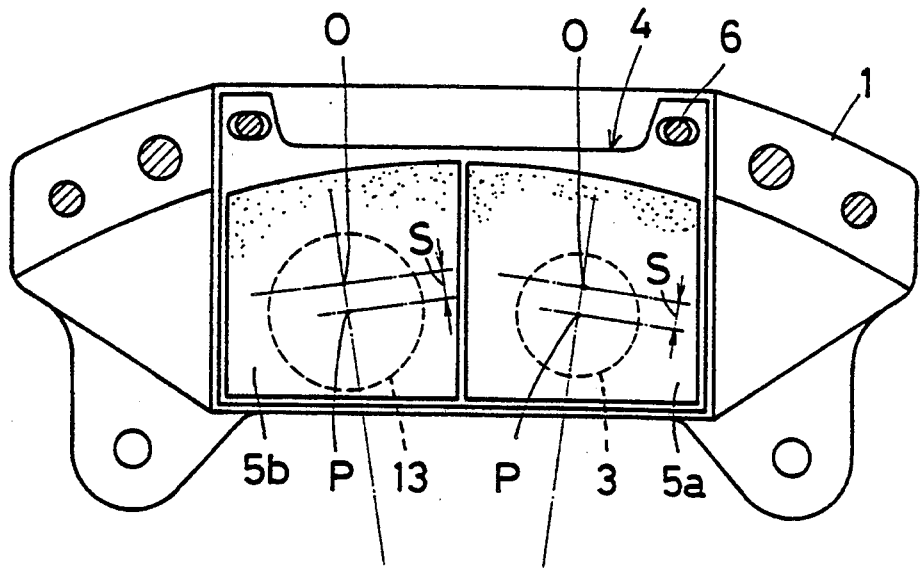
FIG. 3 is a front view of still another embodiment of a disk brake showing the same state as FIG. 1.
Figure 4:
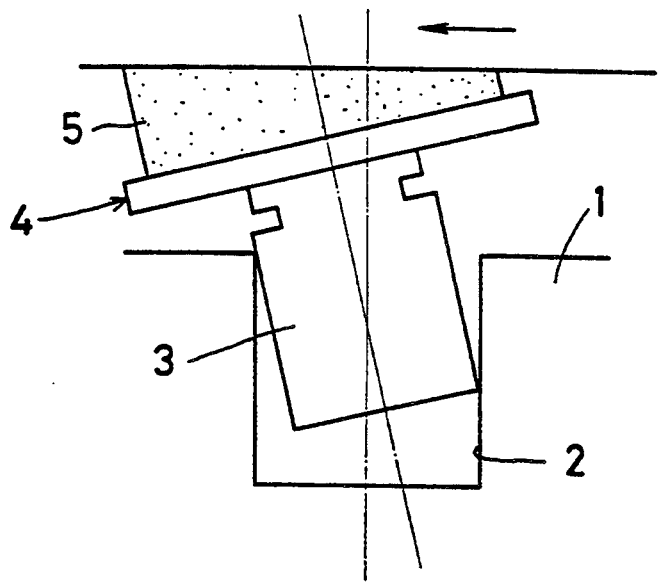
FIG. 4 is a diagrammatic view showing, in exaggeration, a brake piston inclined due to uneven abrasion of a pad in a tangential direction of a disk.

FIG. 3 shows still another embodiment in which two brake pistons 3 and 13 having different diameters are used to urge a single pad 4. One of the pistons is located at the leading disk side and has a greater diameter and thus a greater pressure bearing surface than the other. Since the two pistons have different diameters, uneven abrasion of the pad in a tangential direction of the disk can be ceduced to a considerable degree, Thus, in this embodiment, there is no need to arrange the pistons so that their respective centers P of their biasing forces are offset toward the leading disk side from the respective centers O. The centers P are only offset toward the center of the disk from the respective centers O of their frictional surfaces.

What is claimed is:

1. A disk brake, comprising:
   a brake pad having first and second frictional surfaces thereon, each said frictional surface having a center;
   a disk having a center and a leading side and a trailing side relative to said brake pad, wherein each said center of said first and second frictional surfaces is located on a respective radius of said disk, one said radius being located on a leading side of said brake pad and the other said radius being located toward a trailing side of said brake pad; and
   a pair of brake pistons for biasing said brake pad against said disk, said pair of brake pistons comprising a first brake piston located toward the leading side of said brake pad and a second brake piston located toward the trailing side of said brakepad, wherein said first brake piston has a greater pressure bearing area than said second brake piston, wherein said first brake piston provides a biasing force centered on a location on said brake pad that is between said center of said disk and a line passing through said center of said first frictional surface and perpendicular to the one said radius, and wherein said second brake piston provides a biasing force centered on a location on said brake pad that is between said center of said disk and a line passing through said center of said second frictional surface and perpendicular to the other said radius;
   wherein said locations of the centered biasing forces of said first and second brake pistons are disposed on the one said radius and the other said radius, respectively.

2. The disk brake of claim 1, wherein said pressure bearing areas of said first and second brake pistons are centered on the respective said locations on said brake pad.

3. The disk brake of claim 1, wherein said first and second brake pistons have the same amount of fluid pressure applied thereto.

* * * * *